United States Patent
Hashimoto et al.

(10) Patent No.: US 10,084,363 B2
(45) Date of Patent: Sep. 25, 2018

(54) STATOR ASSEMBLY METHOD AND STATOR ASSEMBLY APPARATUS

(71) Applicant: AISIN AW CO., LTD., Anjo-shi, Aichi-ken (JP)

(72) Inventors: Shingo Hashimoto, Okazaki (JP); Shigeru Maeda, Toyota (JP); Masumi Tomura, Anjo (JP); Shingo Sato, Okazaki (JP)

(73) Assignee: AISIN AW CO., LTD., Anjo (JP)

( * ) Notice: Subject to any disclaimer, the term of this patent is extended or adjusted under 35 U.S.C. 154(b) by 176 days.

(21) Appl. No.: 15/300,046

(22) PCT Filed: Jun. 5, 2015

(86) PCT No.: PCT/JP2015/066418
§ 371 (c)(1),
(2) Date: Sep. 28, 2016

(87) PCT Pub. No.: WO2015/186838
PCT Pub. Date: Dec. 10, 2015

(65) Prior Publication Data
US 2017/0141660 A1 May 18, 2017

(30) Foreign Application Priority Data

Jun. 5, 2014 (JP) ................................. 2014-117144

(51) Int. Cl.
| | | |
|---|---|---|
| *H02K 15/00* | (2006.01) | |
| *H02K 15/14* | (2006.01) | |
| *H02K 15/16* | (2006.01) | |
| *H02K 15/02* | (2006.01) | |
| *H02K 15/085* | (2006.01) | |
| *H02K 15/06* | (2006.01) | |

(52) U.S. Cl.
CPC ........... *H02K 15/026* (2013.01); *H02K 15/06* (2013.01); *H02K 15/085* (2013.01)

(58) Field of Classification Search
CPC ..... H02K 15/026; H02K 15/085; H02K 15/06
See application file for complete search history.

(56) References Cited

U.S. PATENT DOCUMENTS 4,455,743 A    6/1984 Witwer et al.
4,543,708 A *  10/1985 Matsubara ............... H02K 3/12
                                                         29/598

(Continued)

FOREIGN PATENT DOCUMENTS

EP    2 009 768 A2   12/2008
JP    S58-39251 A     3/1983

(Continued)

OTHER PUBLICATIONS

Aug. 18, 2015 Search Report issued in International Patent Application No. PCT/JP2015/066418.

(Continued)

*Primary Examiner* — Paul D Kim
(74) *Attorney, Agent, or Firm* — Oliff PLC

(57) ABSTRACT

A stator assembly method in which coils that have slot housed portions and coil ends formed from a conductive wire are mounted to an annular stator core that has a plurality of teeth that extend from a back yoke toward an inner side in a radial direction and slots formed between two of the teeth.

20 Claims, 12 Drawing Sheets

(56) References Cited

U.S. PATENT DOCUMENTS

| | | | | |
|---|---|---|---|---|
| 5,350,960 | A * | 9/1994 | Kiri | H02K 1/16 |
| | | | | 310/194 |
| 7,467,648 | B2 * | 12/2008 | Hashimoto | H02K 15/0435 |
| | | | | 140/71 C |
| 8,857,042 | B2 | 10/2014 | Hasegawa et al. | |
| 2010/0259124 | A1 | 10/2010 | Bodin et al. | |
| 2014/0013592 | A1 | 1/2014 | Yoshida et al. | |
| 2017/0141659 | A1 * | 5/2017 | Hashimoto | H02K 15/026 |

FOREIGN PATENT DOCUMENTS

| | | | |
|---|---|---|---|
| JP | S60-74949 | A | 4/1985 |
| JP | 2004-248434 | A | 9/2004 |
| JP | 2008-104293 | A | 5/2008 |
| JP | 2009-524392 | A | 6/2009 |
| JP | 2009-195006 | A | 8/2009 |
| JP | 2011-193597 | A | 9/2011 |
| JP | 2013-038898 | A | 2/2013 |
| JP | 2014-007819 | A | 1/2014 |
| JP | 2014-023183 | A | 2/2014 |
| JP | 2014-064347 | A | 4/2014 |
| KR | 10-2008-0089394 | A | 10/2008 |

OTHER PUBLICATIONS

May 19, 2017 Supplementary European Search Report issued in European Patent Application No. 15803939.6.

* cited by examiner

CIRCUMFERENTIAL DIRECTION

STATOR ASSEMBLY METHOD AND STATOR ASSEMBLY APPARATUS

BACKGROUND

The present disclosure relates to a stator assembly method and a stator assembly apparatus, and in particular to a method and an apparatus that mount coils that each have slot housed portions and coil end portions formed from a conductive wire to an annular stator core that has a plurality of teeth that extend radially inward from a back yoke and slots formed between two teeth.

Hitherto, there have been known a stator assembly method and a stator assembly apparatus that mount coils to an annular stator core (see Japanese Patent Application Publication No. 2011-193597, for example). The stator core has a plurality of teeth that extend radially inward from a back yoke, and slots formed between two teeth. The coils are formed from a conductive wire, and each have linear portions to be housed in the slots and coil end portions positioned outside the slots. A plurality of coils are combined with each other to form an annular coil assembly.

The stator assembly apparatus includes a jig disposed on the radially inner side of the stator core. The jig is formed in a generally circular column shape, and has a plurality of holding grooves which are provided in the outer peripheral surface of the jig and to which the linear portions of the coils of the coil assembly are to be inserted. The stator assembly method includes a step of attaching coils sequentially in the circumferential direction to holding grooves of a jig one by one, and a step of disposing the coils, which have been attached to the jig, in a radially inner space of a stator core and pushing out the coils radially from the radially inner side toward the radially outer side to insert linear portions of the coils into slots of the stator core.

SUMMARY

In the stator assembly method and the stator assembly apparatus described in Japanese Patent Application Publication No. 2011-193597, the jig in a generally circular column shape is structured such that the interval of adjacent holding grooves formed in the outer peripheral surface of the jig is smaller at a position closer to the center of the jig. Thus, in the course of assembling the coils of the coil assembly to the jig, the coils are deformed such that the linear portions on both sides, which have been relatively far from each other, are brought closer to each other, and thereafter deformed again when the coils are assembled to the stator core.

Therefore, in the technique in which the coils configured as described above are assembled to the jig in a generally circular column shape and then mounted to the annular stator core, portions of the coil end portions that are preferably not bent are deformed to be work-hardened when the coils are assembled to the jig before being assembled to the stator core. For example, for coils formed in a generally hexagonal shape, the portions of the coil end portions that are preferably not bent include linear oblique portions of the coil end portions. Therefore, portions of the coils to be housed in the slots are defoimed significantly after the coils are assembled to the stator core, and a pressure (surface pressure) with which the coils are pressed against the wall surfaces of teeth in the slots is increased, which increases the insertion load. As a result, there may be a flaw in the coils, degradation in accuracy in shape of the coils after being assembled, and a disadvantage such as an increase in size of equipment, for example.

The present disclosure has been made in view of the foregoing issues, and therefore an exemplary aspect of the disclosure provides a stator assembly method and a stator assembly apparatus capable of suppressing the insertion load of inserting coils into slots when a coil assembly, in which a plurality of coils that each have coil end portions and linear portions are combined with each other, is inserted from the radially inner side toward the radially outer side of an annular stator core to be mounted to the stator core.

An exemplary aspect of the present disclosure provides a stator assembly method in which coils that have slot housed portions and coil ends formed from a conductive wire are mounted to an annular stator core that has a plurality of teeth that extend from a back yoke toward an inner side in a radial direction and slots formed between two of the teeth, including: forming a coil assembly in which a plurality of the coils are disposed in an annular arrangement and in which the slot housed portions of two of the coils located away from each other in a circumferential direction form slot housed bundles to be housed in the same slot of the stator core; moving guide jigs configured to form guide surfaces with respect to tooth holes, of the coil assembly, formed between two of the slot housed bundles disposed adjacent to each other in the circumferential direction and inserting the guide jigs into the tooth holes to dispose the guide jigs with respect to the coil assembly; and pushing out the plurality of the coils which form the coil assembly radially from a radially inner side toward a radially outer side, with the coil assembly disposed in a radially inner space of the stator core and with the guide surfaces of the guide jigs in parallel with wall surfaces of the teeth, to insert the slot housed portions of the coils into the slots of the stator core while the guide jigs are guiding the plurality of the coils.

Another aspect of the present disclosure provides a stator assembly apparatus that mounts coils that have slot housed portions and coil ends formed from a conductive wire to an annular stator core that has a plurality of teeth that extend from a back yoke toward an inner side in a radial direction and slots formed between two of the teeth, including: guide jigs configured to form guide surfaces, the guide jigs being moved with respect to tooth holes of a coil assembly and inserted into the tooth holes to be disposed with respect to the coil assembly, the tooth holes being formed between two of slot housed bundles, which are disposed adjacent to each other in a circumferential direction, the coil assembly in which a plurality of the coils are disposed in an annular arrangement and in which the slot housed portions of two of the coils located away from each other in a circumferential direction form the slot housed bundles to be housed in the same slot of the stator core; and a pusher for pushing out the plurality of the coils which faun the coil assembly radially from a radially inner side toward a radially outer side, with the coil assembly disposed in a radially inner space of the stator core and with the guide surfaces of the guide jigs in parallel with wall surfaces of the teeth, to insert the slot housed portions of the coils into the slots of the stator core while the guide jigs are guiding the plurality of the coils.

According to the present disclosure, it is possible to suppress the insertion load of inserting coils into slots when a coil assembly, in which a plurality of coils that each have coil ends and linear portions are combined with each other, is inserted from the radially inner side toward the radially outer side of an annular stator core to be mounted to the stator core.

DETAILED DESCRIPTION OF EMBODIMENTS

A stator assembly method and a stator assembly apparatus according to a specific embodiment of the present disclosure will be described below with reference to the drawings.

Figure 1:
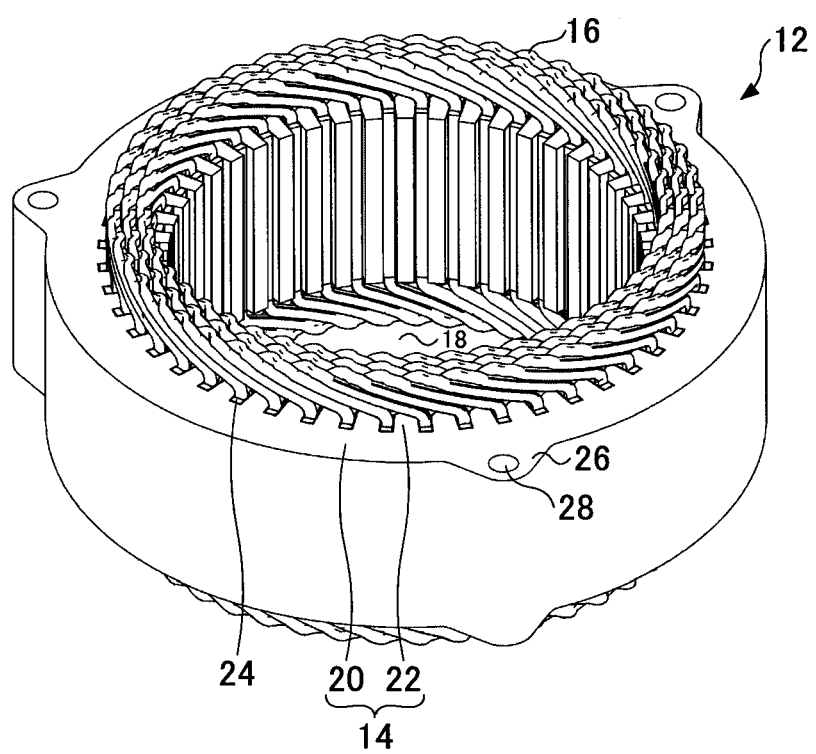
FIG. 1 is a perspective view of a stator that has been assembled using a stator assembly method and a stator assembly apparatus according to an embodiment of the present disclosure.
Figure 2:
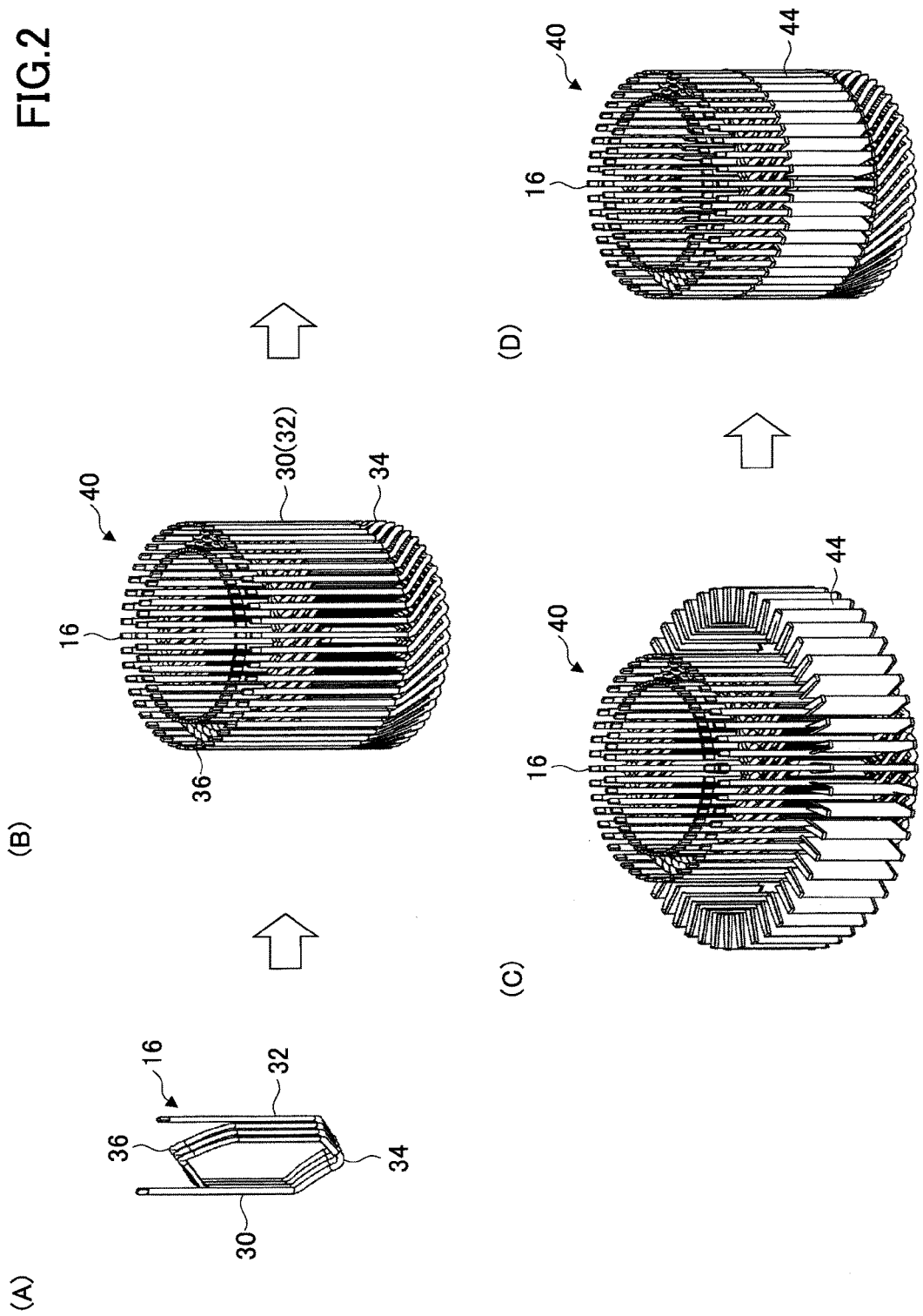
FIG. 2 illustrates a procedure for forming a coil assembly in an annular cage shape from a plurality of coaxially wound coils in the embodiment.
Figure 3A:
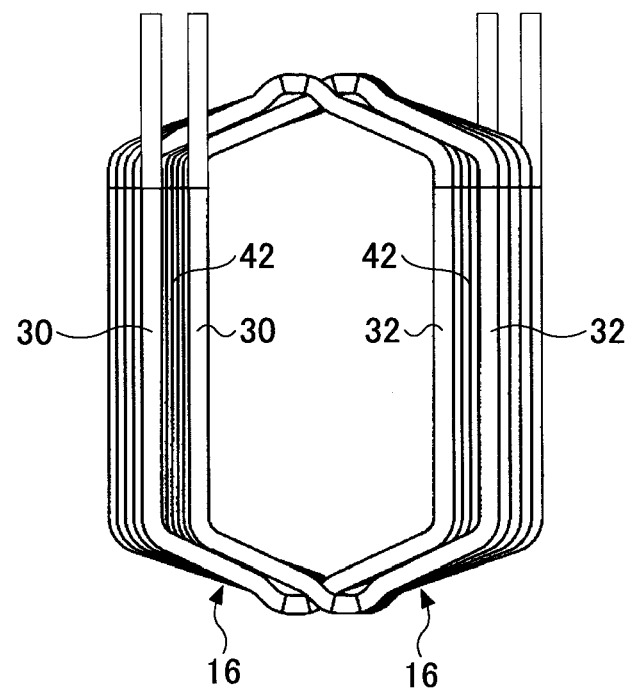
FIG. 3A illustrates the positional relationship between two coaxially wound coils of the same phase, slot housed portions of which are to be housed in the same slot, in the embodiment as seen from the axial center side.
Figure 3B:
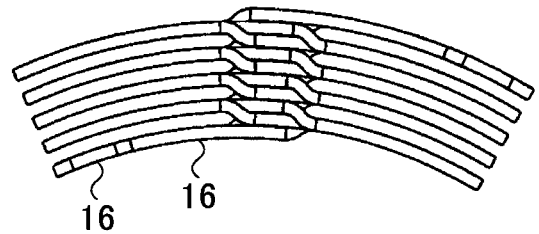
FIG. 3B illustrates the positional relationship between two coaxially wound coils of the same phase, slot housed portions of which are to be housed in the same slot, in the embodiment as seen from a side in the axial direction.

FIG. 1 is a perspective view of a stator that has been assembled using a stator assembly method and a stator assembly apparatus according to an embodiment of the present disclosure. FIG. 2 illustrates a procedure for forming a coil assembly in an annular cage shape from a plurality of coaxially wound coils in the embodiment. FIG. 3 illustrates the positional relationship between two coaxially wound coils of the same phase, slot housed portions of which are to be housed in the same slot, in the embodiment. FIG. 3A is a view as seen from the axial center side. FIG. 3B is a view as seen from a side in the axial direction.

A stator assembly apparatus 10 according to the embodiment is an apparatus that assembles a stator 12, which serves as a stationary element for use in a rotary electric machine such as a three-phase AC motor, for example. The stator 12 is a member disposed on the radially outer side with respect to a rotor, which serves as a rotary element, via a predetermined air gap to generate a magnetic field that rotates the rotor when the stator 12 is energized. The stator 12 includes a stator core 14 and stator coils 16.

The stator core 14 is a member formed in a hollow cylindrical shape. A space (radially inner space) 18 configured to house the rotor is formed on the radially inner side of the stator core 14. The stator core 14 may be formed by stacking a plurality of magnetic steel sheets coated for insulation in the axial direction. A cylindrical yoke formed from a material compacted from soft magnetic powder and coated for insulation may be attached to an end surface of the stator core 14 on the radially outer side.

The stator core 14 has a back yoke 20 formed in an annular shape, and teeth 22 that extend from an end surface of the back yoke 20 on the radially inner side toward the radially inner side (toward the axial center). The back yoke 20 includes a plurality of (e.g. 48) teeth 22 provided in the circumferential direction. The teeth 22 are provided at equal intervals along the circumferential direction. A slot 24 in which the stator coil 16 is held is formed between two teeth 22 that are adjacent to each other in the circumferential direction.

The stator core 14 is provided with lug portions 26 configured to attach and fix the stator 12 to a motor case. The lug portions 26 are formed in a mound shape to project radially outward from an end surface (outer peripheral surface) of the body (specifically, the back yoke 20) of the stator core 14 on the radially outer side. A plurality of (e.g. three) lug portions 26 are provided away from each other in the circumferential direction. The lug portions 26 are provided with through holes 28 that penetrate in the axial direction. The stator 12 is fixed to the motor case with bolts that penetrate the through holes 28 of the lug portions 26 fastened to nuts via the motor case.

The stator coils 16 are formed from a conductive wire. The conductive wire is constituted of highly conductive metal such as copper or aluminum, for example. The conductive wire may be formed in a circular shape in cross section, but may be a rectangular conductive wire formed in a rectangular shape (specifically, an oblong shape) in cross section. In the following description, the conductive wire is assumed to be a rectangular conductive wire. The corner portions, in cross section, of the rectangular conductive wire may be rounded. The stator core 14 includes a plurality of (e.g. 48) stator coils 16 disposed in the circumferential direction.

The stator coils 16 are each a coaxially wound coil (cassette coil) shaped by bending a conductive wire wound a plurality of turns (e.g. five turns). In the following description, the stator coils 16 will be referred to as "coaxially wound coils 16". The coaxially wound coils 16 are shaped by a winding forming device by winding a single linear conductive wire a predetermined plural number of turns while being formed into an elliptical shape, and thereafter by a shaping device by bending the winding into a generally hexagonal shape or a generally octagonal shape.

The coaxially wound coils 16 each have slot housed portions 30 and 32 and coil end portions 34 and 36 (i.e., coil ends). The slot housed portions 30 and 32 are portions to be housed in the slots 24 of the stator core 14, and extend generally linearly so as to penetrate the slots 24 in the axial direction. The slot housed portion 30 and the slot housed portion 32 are housed in different slots 24 located at a predetermined distance away from each other in the circumferential direction of the stator core 14. The coil end portions 34 and 36 are portions that project axially outward from end portions of the stator core 14 in the axial direction, and are curved so as to link the two slot housed portions 30 and 32, which are located away from each other in the circumferential direction, to each other.

The coaxially wound coils 16 are configured such that a plurality of conductive wires are stacked on each other, and configured such that a predetermined clearance is formed between conductive wires that are adjacent to each other in the stacking direction. In the case where the conductive wire is a rectangular conductive wire, the stacking direction of the conductive wires may be the direction of the short sides, in cross section, of the rectangular conductive wire. The coaxially wound coils 16 are formed in a trapezoidal shape in section such that the separation distance (interval) between the two slot housed portions 30 and 32 is varied in accordance with the position in the stacking direction. The coaxially wound coils 16 are formed in a trapezoidal shape in section so that the slot housed portions 30 and 32 of the coaxially wound coils 16 are appropriately housed in the slots 24. The coaxially wound coils 16 are assembled to the stator core 14 such that the stacking direction of the conductive wires coincides with radial directions that are orthogonal to the axial direction of the stator core 14.

The coil end portions 34 and 36 of the coaxially wound coils 16 are formed into a plurality of different non-linear shapes. Specifically, the coil end portions 34 and 36 are formed into three types of non-linear shapes, and crank-shaped into a crank shape in which the conductive wire is bent in a staircase shape in the radial direction of the stator core 14, arc-shaped into an arc shape in which the conductive wire is curved in accordance with the arc of the annular stator core 14, and edgewise-shaped into a bent shape in which the conductive wire is bent in the direction of the long sides, in cross section, of the rectangular conductive wire. Crank-shaping is a bending process performed for a lane change between conductive wires in the stacking direction of the rectangular conductive wires. Arc-shaping is a bending process performed in order that the coaxially wound coils 16 are efficiently housed in the slots 24. Edgewise-shaping is a bending process performed in order that the plurality of coaxially wound coils 16 are efficiently disposed.

A plurality of coaxially wound coils 16 are disposed in the circumferential direction to constitute the coil assembly 40 in an annular cage shape. The coil assembly 40 is formed in an annular cage shape with the plurality of coaxially wound coils 16 arranged side by side in the circumferential direction and disposed in an annular arrangement. The coaxially wound coils 16 are configured such that the interval of the slot housed portions 30 and 32 on both sides is relatively small before the coaxially wound coils 16 are combined with each other to form the coil assembly 40. After the plurality of coaxially wound coils 16 are disposed in an annular arrangement and combined with each other to form the coil assembly 40, the coil assembly 40 has an outside diameter that allows the coil assembly 40 to be housed in the radially inner space 18 of the stator core 14.

The coil assembly 40 is formed such that the contents of the following (A) to (C) are achieved. (A) The plurality of coaxially wound coils 16 are disposed so as to be housed in the slots 24 as displaced one by one in the circumferential direction. (B) Two coaxially wound coils 16 disposed adjacent to each other in the circumferential direction are assembled such that the rectangular conductive wires in each level alternately overlap each other in the stacking direction (i.e. the radial direction). (C) Two coaxially wound coils 16 of the same phase disposed a predetermined distance away from each other in the circumferential direction are assembled such that the rectangular conductive wire in each level of the slot housed portion 30 of one of the coaxially wound coils 16 and the rectangular conductive wire in each level of the slot housed portion 32 of the other are housed side by side alternately in the stacking direction (i.e. the radial direction) in the same slot 24 of the stator core 14.

When the assembly described in (B) is performed, tooth holes 42, into which the teeth 22 of the stator core 14 are to be inserted to be disposed, are formed between the slot housed portions 30 and 32 of two coaxially wound coils 16, of the coil assembly 40, disposed adjacent to each other in the circumferential direction. In the following description, a bundle of the slot housed portions 30 and 32 of two coaxially wound coils 16, of the coil assembly 40, to be housed in the same slot 24 will be referred to as a "slot housed bundle 46". That is, the tooth holes 42 are each formed between two slot housed bundles 46, of the coil assembly 40, disposed adjacent to each other in the circumferential direction.

In the case where the stator 12 is applied to a three-phase AC motor, for example, the coaxially wound coils 16 constitute any of a U-phase coil, a V-phase coil, and a W-phase coil. For example, the coil assembly 40 is configured such that two coils of the same phase, namely U-phase coils, V-phase coils, and W-phase coils, which are the coaxially wound coils 16, are disposed side by side in the circumferential direction so that six coaxially wound coils 16 arranged in the circumferential direction form one pole.

The stator 12 includes insulating members 44 configured to secure electrical insulation between the stator core 14 and the coaxially wound coils 16. The insulating members 44 each have a shape that matches the slot 24 of the stator core 14, and are each formed in a C-shape in section to be mounted to the slot 24. The insulating members 44 are each formed in a thin film shape from paper, a resin (such as a thermosetting resin or a thermoplastic resin, for example), or the like. After the coil assembly 40 is formed from a predetermined plural number of coaxially wound coils 16, the insulating members 44 are mounted to the coil assembly 40 by fitting the insulating members 44 onto the slot housed portions 30 and 32 of the coaxially wound coils 16 (i.e. the slot housed bundles 46 of the coil assembly 40) from the radially outer side toward the radially inner side of the slot housed portions 30 and 32.

Next, a procedure for assembling the stator 12 using the stator assembly apparatus 10 according to the embodiment will be described with reference to FIGS. 4 to 10.

Figure 4:
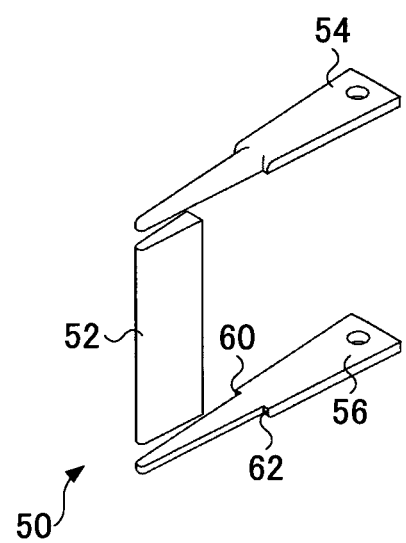
FIG. 4 is a perspective view of a guide jig of the stator assembly apparatus according to the embodiment.
Figure 5:
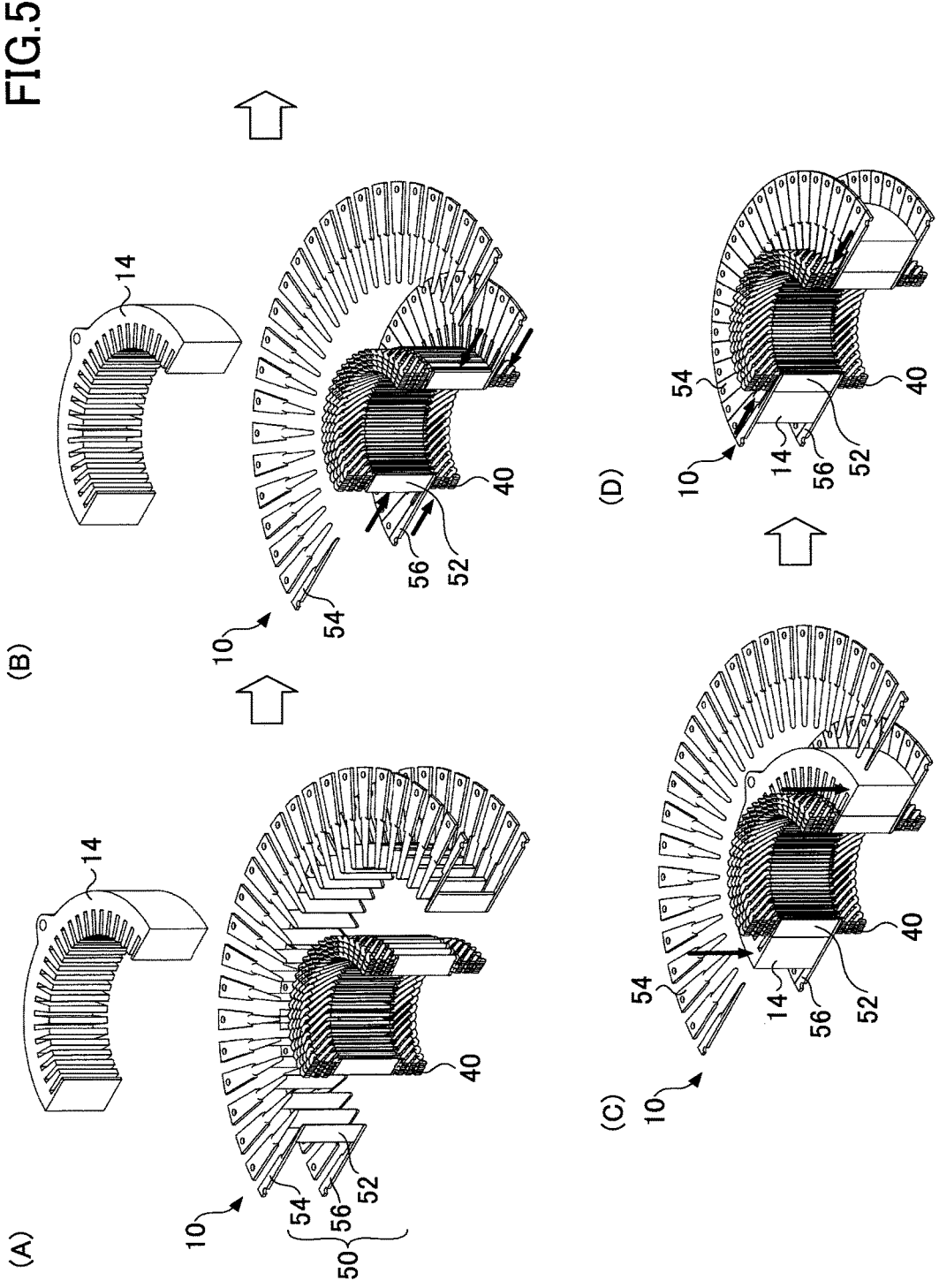
FIG. 5 illustrates steps of assembling the stator in the stator assembly apparatus according to the embodiment.

FIG. 4 is a perspective view of a guide jig of the stator assembly apparatus 10 according to the embodiment. FIG. 5 illustrates steps of assembling the stator 12 in the stator assembly apparatus 10 according to the embodiment. In FIG. 5, from the viewpoint of the convenience of description and the ease of understanding, the stator assembly apparatus 10 and the stator 12 are illustrated as cut into a half along a direction that is parallel to the axis.

In the embodiment, the stator assembly apparatus 10 includes guide jigs 50 that are necessary to assemble the stator 12 (specifically, to insert the coaxially wound coils 16 into the slots 24 of the stator core 14). The guide jigs 50 are attached to each of the tooth holes 42 of the coil assembly 40. A plurality of guide jigs 50 are provided to one coil assembly 40. The guide jigs 50 are attached to the coil assembly 40 after the coil assembly 40 in an annular cage shape is formed and after the insulating members 44 are mounted to the slot housed portions 30 and 32 of the coaxially wound coils 16 of the coil assembly 40.

The coil assembly 40 is configured such that the separation distance between the two slot housed portions 30 and 32 of each coaxially wound coil 16 (i.e. the interval of two slot housed bundles 46 that are adjacent to each other in the circumferential direction) is small before the slot housed portions 30 and 32 of each coaxially wound coil 16 are inserted into the slots 24 of the stator core 14 compared to that after such insertion. That is, the coil assembly 40 is configured such that the axial length (the distance from the distal end of the coil end portion 34 in the axial direction to the distal end of the coil end portion 36 in the axial direction) is large and the outside diameter is small (specifically, the outside diameter is slightly smaller than the inside diameter of the teeth 22 of the stator core 14) before the insertion described above compared to those after the insertion.

In the following description, for convenience, the coil assembly 40 before the slot housed portions 30 and 32 are inserted into the slots 24 of the stator core 14 will be referred to as an "initial coil assembly 40", and the coil assembly 40 after the slot housed portions 30 and 32 are inserted into the slots 24 of the stator core 14 will be referred to as a "final coil assembly 40".

As illustrated in FIG. 4, the guide jigs 50 each have a first guide jig 52, the entirety of which is to be inserted into the tooth hole 42 of the initial coil assembly 40. The first guide jig 52 is a jig formed in the shape of a plate that extends in both the radial direction and the axial direction of the stator 12 and the stator core 14 so as to be fitted in the tooth hole 42 of the initial coil assembly 40. The first guide jig 52 is formed in a tapered shape in which the thickness (width) in the circumferential direction becomes smaller from the radially outer side toward the radially inner side.

The first guide jigs 52 are provided adjacently on the radially inner side of the teeth 22 to oppose the teeth 22 when the slot housed portions 30 and 32 of the coaxially wound coils 16 of the coil assembly 40 are inserted into the slots 24. The first guide jigs 52 each have a planar guide surface. The guide surfaces of the first guide jigs 52 are parallel to the wall surfaces of the teeth 22 (i.e. side surfaces that face the slots 24 in the circumferential direction) when the coaxially wound coils 16 are inserted into the slots 24. The first guide jigs 52 are formed such that the width (i.e. the thickness in the circumferential direction) at the position of the radially outer end is generally the same as or slightly larger than the width at the distal end (the position of the radially inner end) of the teeth 22 of the stator core 14. The first guide jigs 52 have a function of guiding the coaxially wound coils 16 of the coil assembly 40 in the circumferential direction when the coaxially wound coils 16 are inserted into the slots 24.

The guide jigs 50 each also have second and third guide jigs 54 and 56 that are partially inserted into the tooth holes 42 of the initial coil assembly 40. The second guide jig 54 is disposed adjacently on one side, in the axial direction, with respect to the first guide jig 52. The third guide jig 56 is disposed adjacently on the other side, in the axial direction, with respect to the first guide jig 52. The second and third guide jigs 54 and 56 are each formed in the shape of a wedge that extends in the radial direction and that has a pointed end on the radially inner side.

The second and third guide jigs 54 and 56 are each formed in a tapered shape in which the thickness in the circumferential direction becomes smaller from the radially outer side toward the radially inner side. The second guide jigs 54 are provided adjacently on the outer side, in the axial direction, of the teeth 22 to oppose the teeth 22 when the coaxially wound coils 16 of the coil assembly 40 are inserted into the slots 24. The third guide jigs 56 are provided adjacently on the outer side, in the axial direction, of the teeth 22 to oppose the teeth 22 when the coaxially wound coils 16 of the coil assembly 40 are inserted into the slots 24.

The second and third guide jigs 54 and 56 extend in the radial direction on the outer side, in the axial direction, of the stator core 14 so as to overlap the teeth 22 as seen in the axial direction. The second and third guide jigs 54 and 56 are formed such that the width (i.e. the thickness in the circumferential direction) of the second and third guide jigs 54 and 56 at each position in the radial direction on the radially inner side is generally the same as the width of the first guide jigs 52 at the same position in the radial direction, and formed such that the width of the second and third guide jigs 54 and 56 at each position in the radial direction is equal to or more than the width of the teeth 22 at the same position in the radial direction.

The second and third guide jigs 54 and 56 have a function of guiding the coaxially wound coils 16 of the coil assembly 40 in the circumferential direction when the slot housed portions 30 and 32 of the coaxially wound coils 16 are inserted into the slots 24, and have a function of preventing the insulating members 44 from slipping off in the axial direction from the teeth 22.

The second and third guide jigs 54 and 56 are each provided with cut portions 60 and 62. The cut portions 60 and 62 are portions that are provided on the radially inner side and that communicate with holes formed between two first guide jigs 52 that are adjacent to each other in the circumferential direction and the slots 24 of the stator core 14 when the coaxially wound coils 16 are inserted into the slots 24. When two second guide jigs 54 disposed adjacent to each other in the circumferential direction are arranged in the circumferential direction, the cut portion 60 of one of the guide jigs 54 and the cut portion 62 of the other guide jig 54 form a hole that guides the coaxially wound coils 16 when the coaxially wound coils 16 are inserted into the slots. When two third guide jigs 56 disposed adjacent to each other in the circumferential direction are arranged in the circumferential direction, the cut portion 60 of one of the guide jigs 56 and the cut portion 62 of the other guide jig 56 form a hole that guides the coaxially wound coils 16 when the coaxially wound coils 16 are inserted into the slots.

In the stator assembly apparatus 10 according to the embodiment, the initial coil assembly 40 in which the plurality of coaxially wound coils 16 are disposed in an annular arrangement is formed, the insulating members 44 are mounted to the slot housed portions 30 and 32 of the coaxially wound coils 16 of the initial coil assembly 40, and thereafter the guide jigs 50 are inserted into the tooth holes 42 of the initial coil assembly 40 to be attached. Specifically, first, as illustrated in FIG. 5A, the initial coil assembly 40 in which the plurality of coaxially wound coils 16 are disposed in an annular arrangement and to which the insulating members 44 are mounted, the plurality of guide jigs 50, and the stator core 14 are prepared. Then, as illustrated in FIG. 5B, the first guide jigs 52 and the third guide jigs 56 are moved from the radially outer side toward the radially inner side of the coil assembly 40 to be inserted into the tooth holes 42 of the initial coil assembly 40 so that the guide jigs 52 and 56 are disposed with respect to the coil assembly 40.

As described above, the initial coil assembly 40 is configured such that the outside diameter of the initial coil assembly 40 is slightly smaller than the inside diameter of the teeth 22 of the stator core 14. Thus, the stator core 14 can be assembled to the initial coil assembly 40, in which the first guide jigs 52 and the third guide jigs 56 have been inserted into the tooth hole 42, from the side, in the axial direction, on which the second guide jigs 54 have not been attached yet.

Thus, after the first and third guide jigs 52 and 56 are attached to the initial coil assembly 40, as illustrated in FIG. 5C, the stator core 14, in which the teeth 22 project toward the radially inner side, is assembled to the initial coil assembly 40 from the side, in the axial direction, on which the second guide jigs 54 have not been attached yet. When such assembly is performed, the initial coil assembly 40 is disposed in the radially inner space 18 of the stator core 14. Lastly, as illustrated in FIG. 5D, the second guide jigs 54 are moved from the radially outer side toward the radially inner side of the coil assembly 40 to be inserted into the tooth holes 42 of the initial coil assembly 40 so that the second guide jigs 54 are disposed with respect to the coil assembly 40.

After insertion and disposition of the initial coil assembly 40, to which the first and third guide jigs 52 and 56 have been attached, and the stator core 14, or after insertion of the second guide jigs 54 into the tooth holes 42 after such insertion and disposition, the initial coil assembly 40 and the stator core 14 are positioned with respect to each other in the circumferential direction. This positioning is performed such that the first guide jigs 52 are provided adjacently on the radially inner side of the teeth 22 to oppose the teeth 22, and such that the slot housed portions 30 and 32 of the coaxially wound coils 16 are provided adjacently on the radially inner side of the slots 24 to oppose the slots 24.

Figure 6A:
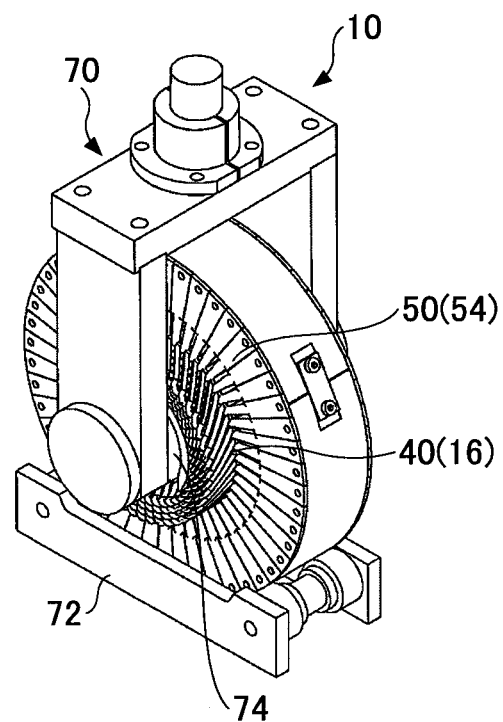
FIG. 6A is a perspective view of a pushing device of the stator assembly apparatus according to the embodiment before insertion of coaxially wound coils 16 into slots of a stator core.
Figure 6B:
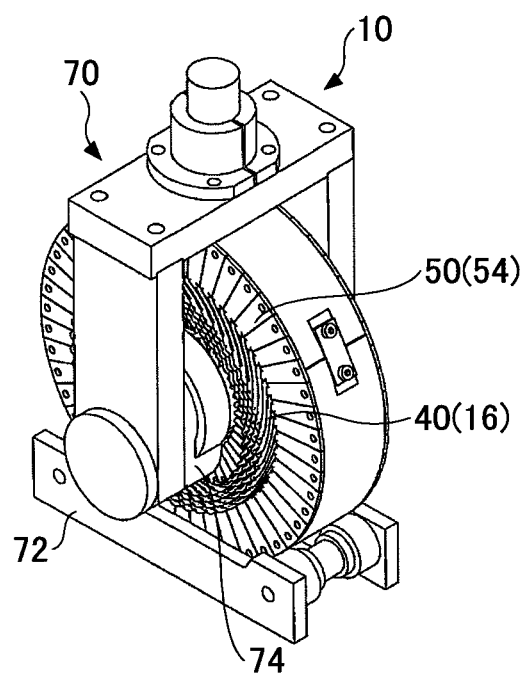
FIG. 6B is a perspective view of the pushing device of the stator assembly apparatus according to the embodiment during insertion of the coaxially wound coils 16 into the slots of the stator core.
Figure 7A:
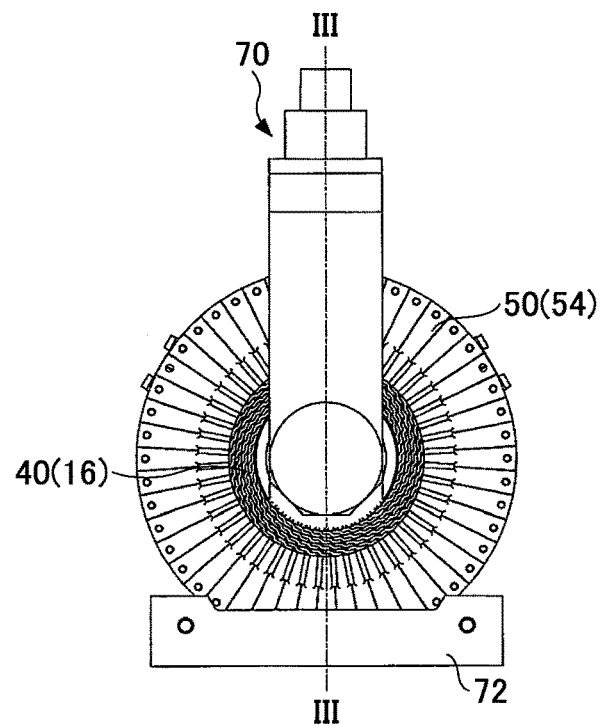
FIG. 7A is a side view of the pushing device of the stator assembly apparatus according to the embodiment, illustrating a state before insertion of the coaxially wound coils into the slots.
Figure 7B:
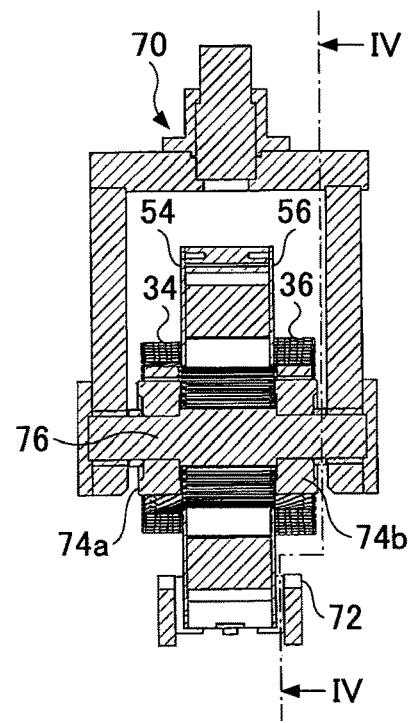
FIG. 7B is a sectional view of the pushing device of the stator assembly apparatus according to the embodiment, illustrating a state before insertion of the coaxially wound coils into the slots.
Figure 7C:
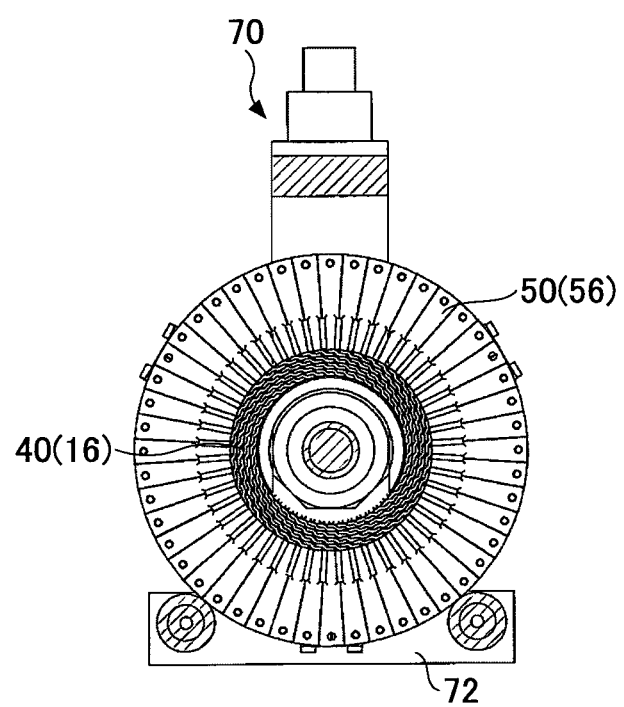
FIG. 7C is a side view of an essential portion of the pushing device of the stator assembly apparatus according to the embodiment, illustrating a state before insertion of the coaxially wound coils into the slots.
Figure 8A:
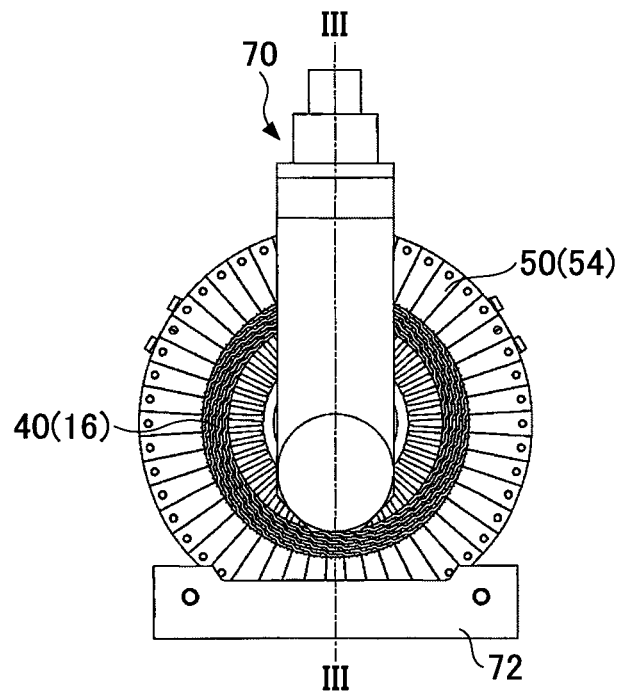
FIG. 8A is a side view of the pushing device of the stator assembly apparatus according to the embodiment, illustrating a state during insertion of the coaxially wound coils into the slots.
Figure 8B:
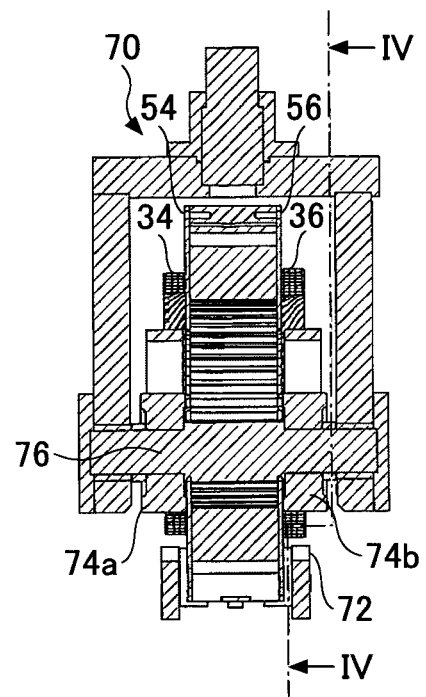
FIG. 8B is a sectional view of the pushing device of the stator assembly apparatus according to the embodiment, illustrating a state during insertion of the coaxially wound coils into the slots.
Figure 8C:
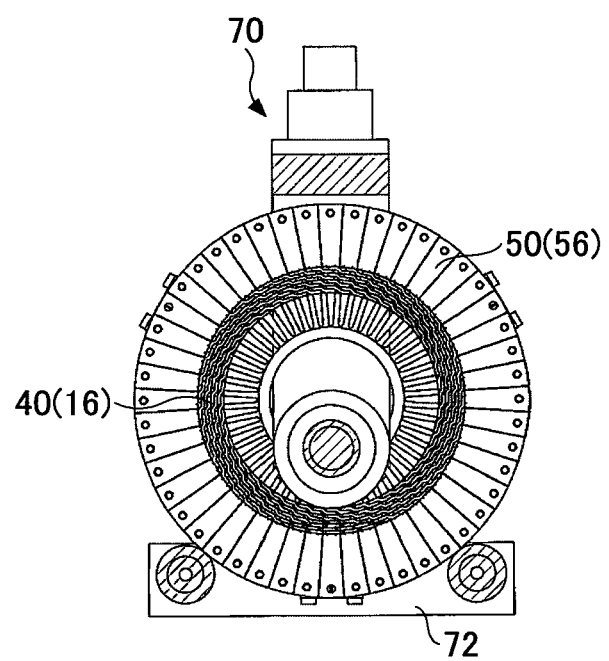
FIG. 8C is a side view of an essential portion of the pushing device of the stator assembly apparatus according to the embodiment, illustrating a state during insertion of the coaxially wound coils into the slots.

FIG. 6 is a perspective view of a pushing device of the stator assembly apparatus 10 according to the embodiment. FIG. 6A illustrates a state before insertion of the coaxially wound coils 16 into the slots 24 of the stator core 14. FIG. 6B illustrates a state during insertion of the coaxially wound coils 16 into the slots 24 of the stator core 14. FIG. 7 is a view of the pushing device of the stator assembly apparatus 10 according to the embodiment, illustrating a state before insertion of the coaxially wound coils 16 into the slots 24. FIG. 8 is a view of the pushing device of the stator assembly apparatus 10 according to the embodiment, illustrating a state during insertion of the coaxially wound coils 16 into the slots 24. FIGS. 7A and 8A are each a side view of the pushing device. FIGS. 7B and 8B are each a sectional view of the pushing device illustrated in FIGS. 7A and 8B taken along the line III-III. FIGS. 7C and 8C are each a side view of the pushing device illustrated in FIGS. 7B and 8B in the state of being cut along the line IV-IV.

The stator assembly apparatus 10 also includes a pushing device 70 that generates a pressing force that is necessary to assemble the stator 12 (specifically, to insert the coaxially wound coils 16 into the slots 24 of the stator core 14). The pushing device 70 has a holding stand 72 and a roller 74.

The holding stand 72 holds the stator 12 which includes the coil assembly 40, in which the insulating members 44 are mounted to the slot housed portions 30 and 32 of the coaxially wound coils 16 and in which the guide jigs 50 are attached to the tooth holes 42, and the stator core 14. The holding stand 72 holds the stator 12 so as to be rotatable about an axis. The holding stand 72 holds the stator 12 such that the axis of the stator 12 is directed in the horizontal direction as illustrated in FIG. 6, for example.

The roller 74 is a member that pushes out the plurality of coaxially wound coils 16 (specifically, the coil end portions 34 and 36), which constitute the coil assembly 40 of the stator 12 which is held by the holding stand 72, radially from the radially inner side toward the radially outer side. The roller 74 is disposed on the radially inner side of the coil assembly 40, and disposed on the axially outer side of the stator core 14. The roller 74 is a member formed in a circular column shape, and is disposed such that the axis of the roller 74 extends in the same direction as the axis of the stator 12.

The roller 74 includes a roller 74a that contacts the coil end portions 34 of the coaxially wound coils 16 of the coil assembly 40, and a roller 74b that contacts the coil end portions 36 of the coaxially wound coils 16 of the coil assembly 40. The roller 74a and the roller 74b are coupled to each other by a shaft 76 that penetrates the radially inner side of the coil assembly 40 in the axial direction.

The holding stand 72 and the roller 74 are relatively movable in the radial direction. For example, the roller 74 is movable with respect to the holding stand 72 in the radial direction of the stator 12 which is held by the holding stand 72. In the case where the holding stand 72 holds the stator 12 such that the axis of the stator 12 is directed in the horizontal direction, the holding stand 72 (i.e. the stator 12) and the roller 74 are relatively movable in the up-down direction. The relative movement of the holding stand 72 and the roller 74 described above is performed in such a range that the slot housed portions 30 and 32 of the coaxially wound coils 16 of the coil assembly 40 are appropriately housed in the slots 24, and that the shaft 76 does not contact the distal ends of the teeth 22 of the stator core 14.

The roller 74a and the roller 74b may not be coupled to each other by the shaft 76, and may be supported in a so-called cantilever manner to contact the coil end portions 34 and 36, respectively. The roller 74a and the roller 74b may be coupled to each other by the shaft 76, and only one of the two rollers 74a and 74b may be supported.

Figure 9:
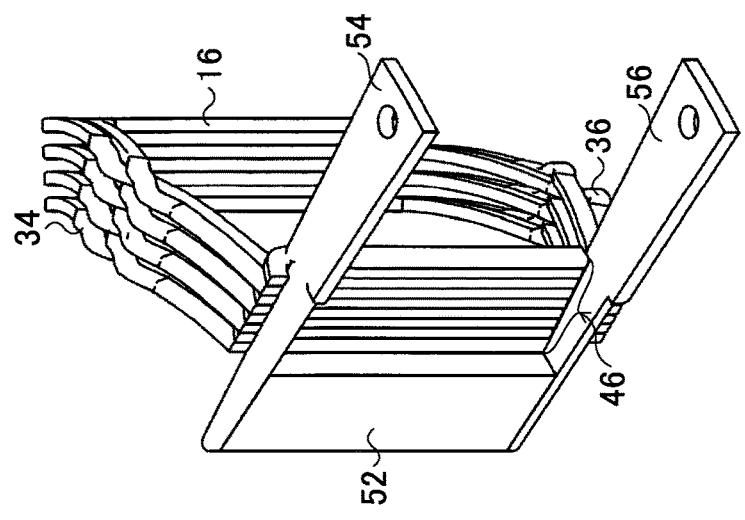
FIG. 9 illustrates the positional relationship between the guide jig and the coaxially wound coil during stator assembly by the stator assembly apparatus according to the embodiment.
Figure 9:
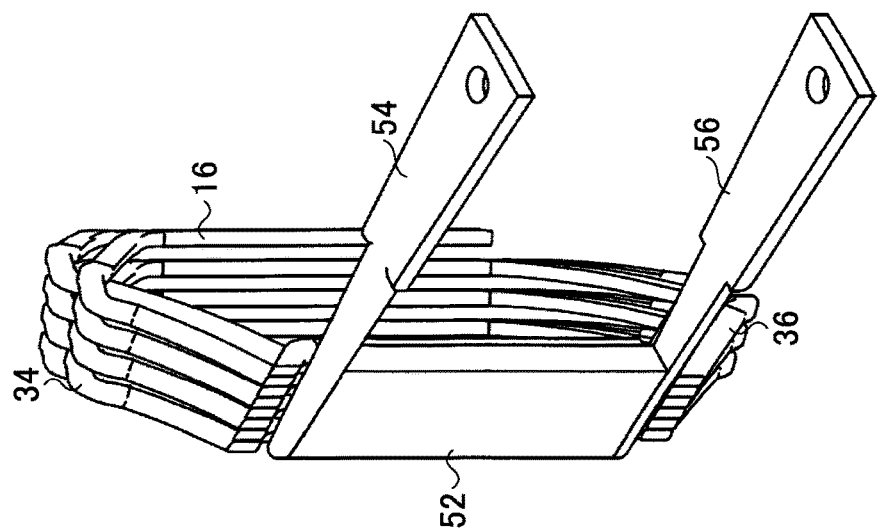
Figure 10:
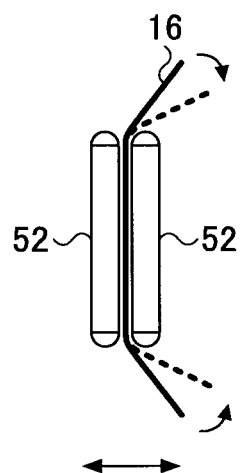
FIG. 10 illustrates the effect of stator assembly by the stator assembly apparatus according to the embodiment.

FIG. 9 illustrates the positional relationship between the guide jig 50 and the coaxially wound coil 16 during stator assembly by the stator assembly apparatus 10 according to the embodiment. FIG. 9A illustrates a state before insertion of the slot housed portions 30 and 32 into the slots 24. FIG. 9B illustrates a state after insertion of the slot housed portions 30 and 32 into the slots 24. FIG. 10 illustrates the effect of stator assembly by the stator assembly apparatus 10 according to the embodiment.

In the stator assembly apparatus 10 according to the embodiment, as described above, the guide jigs 50 are attached to the tooth holes 42 of the initial coil assembly 40, the initial coil assembly 40 is inserted into the radially inner space 18 of the stator core 14 to be disposed, and thereafter the stator 12, in which the initial coil assembly 40 with the guide jigs 50 is disposed in the radially inner space 18 of the stator core 14, is rotatably set to the holding stand 72 (the state illustrated in FIGS. 6A and 7). In the following description, the stator 12 with the guide jigs 50 will be referred to as a "jigged stator 12" as appropriate. In the jigged stator 12, bolts or the like (not illustrated) are used for fixation such that the positional relationship between the guide jigs 50 and the positional relationship between the stator core 14 and the guide jigs 50 are not varied.

The roller 74 is gradually relatively moved with respect to the holding stand 72 from the side of the axial center of the stator 12 toward the radially outer side while rotating the jigged stator 12 which is held by the holding stand 72. When such rotation of the stator 12 and relative movement of the roller 74 are performed, the roller 74a consecutively presses the coil end portions 34 of the coaxially wound coils 16, which constitute the coil assembly 40 of the stator 12, radially outward while consecutively contacting the coil end portions 34, and the roller 74b consecutively presses the coil end portions 36 of the coaxially wound coils 16 radially outward while consecutively contacting the coil end portions 36.

When the coil end portions 34 and 36 of the coaxially wound coils 16 are pressed toward the radially outer side by the roller 74, the slot housed portions 30 and 32, which are linked to the coil end portions 34 and 36, are pulled from the radially inner side toward the radially outer side in accordance with the pressing of the coil end portions 34 and 36. As described above, the initial coil assembly 40 and the stator core 14 are positioned with respect to each other in the circumferential direction such that the first guide jigs 52 are provided adjacently on the radially inner side of the teeth 22 to oppose the teeth 22, and such that the slot housed portions 30 and 32 of the coaxially wound coils 16 are provided adjacently on the radially inner side of the slots 24 to oppose the slots 24. In this event, the guide surfaces of the first guide jigs 52 are parallel to the wall surfaces of the slots 24. The second and third guide jigs 54 and 56 are provided with the cut portions 60 and 62 which guide the coaxially wound coils 16 when the coaxially wound coils 16 are inserted into the slots.

Therefore, the slot housed portions 30 and 32 are pulled toward the radially outer side in accordance with the pressing of the coil end portions 34 and 36 as described above to be inserted into the slots 24 while being guided by the first, second, and third guide jigs 52, 54, and 56. In the course of the insertion, the coaxially wound coils 16 are deformed such that the distance (interval), in the circumferential direction, between the slot housed portions 30 and the slot housed portions 32 is gradually increased while the distance, in the axial direction, between the distal end of the coil end portions 34 in the axial direction and the distal end of the coil end portions 36 in the axial direction is gradually reduced (see FIG. 9).

When the slot housed portions 30 and 32 of all the coaxially wound coils 16 that constitute the coil assembly 40 in an annular cage shape are pressed toward the radially outer side, all the coaxially wound coils 16 that are present in the circumferential direction are pushed out radially from the radially inner side toward the radially outer side, and thus the slot housed portions 30 and 32 are inserted into the slots 24 while the coaxially wound coils 16 are guided by the guide jigs 50. The slot housed portions 30 and 32 are inserted as the slot housed bundle 46 which include the slot housed portions 30 and 32 of two coaxially wound coils 16 to be housed in the same slot 24. After the slot housed portions 30 and 32 of all the coaxially wound coils 16 are inserted into the slots 24, relative movement of the roller 74 toward the radially outer side and rotation of the stator 12 are stopped.

With such a stator assembly technique, two coaxially wound coils 16, which are disposed away from each other in the circumferential direction at different positions in the circumferential direction, are assembled such that the rectangular conductive wires of the slot housed portion 30 of one of the coaxially wound coils 16 and the rectangular conductive wires of the slot housed portion 32 of the other coaxially wound coil 16 are arranged alternately in the radial direction in the same slot 24. In addition, after the coil assembly 40 in which a predetermined plural number of coaxially wound coils 16 are disposed in an annular arrangement is formed, the slot housed portions 30 and 32 of the plurality of coaxially wound coils 16 which constitute the coil assembly 40 can be inserted into the slots 24 of the annular stator core 14.

That is, after the initial coil assembly structured as described above is formed, the coil assembly 40 can be assembled to the annular stator core 14 by attaching the guide jigs 50 to the tooth holes 42 which are formed between the slot housed portions 30 and 32 (i.e. two slot housed bundles 46) of two coaxially wound coils 16, of the initial coil assembly 40, disposed adjacent to each other in the circumferential direction, and pushing out the coaxially wound coils 16 toward the radially outer side while inserting the slot housed portions 30 and 32 of the coaxially wound coils 16 into the slots 24 by pressing the coil end portions 34 and 36 of the coaxially wound coils 16, which constitute the initial coil assembly 40 with the guide jigs 50, toward the radially outer side using the roller 74 of the pushing device 70, with the initial coil assembly 40 with the guide jigs 50 disposed in the radially inner space 18 of the stator core 14 and with the guide surfaces of the guide jigs 50 (specifically, the first guide jigs 52) in parallel with the wall surfaces of the teeth 22.

In the stator assembly technique performed by the stator assembly apparatus 10 according to the embodiment, when the coil assembly 40, in which the guide jigs 50 are attached to the tooth holes 42, is assembled to the annular stator core 14 by pushing out the coaxially wound coils 16 toward the radially outer side, the slot housed portions 30 and 32 of the coaxially wound coils 16 are supported by the guide jigs 50. Specifically, the slot housed portions 30 and 32 are guided as interposed between two first guide jigs 52 provided adjacently on both sides in the circumferential direction, guided by the cut portions 60 and 62 of two second guide jigs 54 that are adjacent to each other in the circumferential direction, and guided by the cut portions 60 and 62 of two third guide jigs 56 that are adjacent to each other in the circumferential direction.

Therefore, with the embodiment, as illustrated in FIG. 10, in guiding the slot housed portions 30 and 32 of the coaxially wound coils 16 of the coil assembly 40 during insertion of the slot housed portions 30 and 32 into the slots 24, it is possible to suppress bulging of the slot housed portions 30 and 32 in the circumferential direction, and to suppress buckling of the slot housed portions 30 and 32.

In a configuration (a configuration according to a contrastive example) in which a plurality of coaxially wound coils 16 are disposed in a guide jig, in the outer peripheral surface of which a plurality of holding grooves are formed, unlike the configuration according to the embodiment, in the course of assembling the coils 16 to the guide jig, the coils 16 are deformed such that the slot housed portions 30 and 32 on both sides, which have been relatively far from each other, are brought closer to each other, and thereafter deformed again when the coils 16 are assembled to the stator core 14. Therefore, with the configuration according to the contrastive example, portions (e.g. linear oblique side portions of the coil end portions 34 and 36) of the coil end portions 34 and 36 that are preferably not bent are deformed to be work-hardened when the coils 16 are assembled to the jig before being assembled to the stator core 14. In this case, the slot housed portions 30 and 32 to be housed in the slots 24 are deformed significantly after the coils 16 are assembled to the stator core 14, and a pressure (surface pressure) with which the coils 16 are pressed against the wall surfaces of teeth 22 in the slots 24 is increased, which increases the insertion load.

In the configuration according to the embodiment, in contrast, deformation of the slot housed portions 30 and 32 of the coils 16 closer to each other is not necessary, or the amount of such deformation is significantly small, in the course of assembling the coils 16 and the guide jigs 50 to each other before the coaxially wound coils 16 of the coil assembly 40 are assembled to the stator core 14. Therefore, the oblique side portions etc. of the coil end portions 34 and 36 are not deformed to be work-hardened during assembly of the coils 16 and the guide jigs 50, and deformation of the slot housed portions 30 and 32 is not increased.

Thus, with the embodiment, a pressure (surface pressure), with which the coils 16 are pressed against the wall surfaces of the teeth 22 in the slots 24, is not increased during assembly of the coils 16 to the stator core 14, which suppresses the insertion load during insertion of the coils 16 into the slots 24. Therefore, it is possible to prevent a flaw in the coils 16 and degradation in accuracy in shape of the coils 16 after being assembled to the stator core 14, and to avoid a disadvantage such as an increase in size of manufacturing equipment.

In the stator assembly apparatus 10 according to the embodiment, the second and third guide jigs 54 and 56 are formed such that the width (i.e. the thickness in the circumferential direction) of the second and third guide jigs 54 and 56 at each position in the radial direction is equal to or more than the width of the teeth 22 of the stator core 14 at the same position in the radial direction. Therefore, with the embodiment, rubbing of the rectangular conductive wires of the slot housed portions 30 and 32 of the coaxially wound coils 16 of the coil assembly 40 against surfaces (in particular, sharp corner portions formed on end surfaces) of the teeth 22 can be avoided when the slot housed portions 30 and 32 are guided by the second and third guide jigs 54 and 56 when the slot housed portions 30 and 32 are inserted into the slots 24. Thus, it is possible to prevent a flaw in the coaxially wound coils 16 and a flaw in the surfaces of the teeth 22, and to prevent the insulating members 44 from being easily broken.

In the stator assembly technique performed by the stator assembly apparatus 10 according to the embodiment, when the coil assembly 40, in which the guide jigs 50 are attached to the tooth holes 42, is assembled to the annular stator core 14 by pushing out the coaxially wound coils 16 toward the radially outer side, the assembly can be performed while deforming the coaxially wound coils 16 using only pressing by the roller 74 of the pushing device 70 toward the radially outer side.

Therefore, in the embodiment, unlike a structure in which a pressing jig that presses the coaxially wound coils 16 toward a side in the axial direction is provided, when the coil assembly 40 is assembled to the stator core 14, the coaxially wound coils 16 are not pressed toward a side in the axial direction by a pressing jig located on a side in the axial direction, and the contact surface between such a pressing jig located on a side in the axial direction and the coaxially wound coils 16 does not become minute. Thus, a flaw in the coaxially wound coils 16 can be prevented.

In the stator assembly technique performed by the stator assembly apparatus 10 according to the embodiment, when the coil assembly 40, in which the guide jigs 50 are attached to the tooth holes 42, is assembled to the annular stator core 14 by pushing out the coaxially wound coils 16 toward the radially outer side, the assembly is performed with the stator core 14 held by the holding stand 72 without moving the stator core 14. Thus, it is not necessary to provide a device that moves the stator core 14, which makes it possible to simplify the stator assembly apparatus 10.

In the stator assembly technique performed by the stator assembly apparatus 10 according to the embodiment, the initial coil assembly 40 in which the plurality of coaxially wound coils 16 are disposed in an annular arrangement is formed, and thereafter the insulating members 44 in a C-shape in section are inserted into the slot housed portions 30 and 32 of the coaxially wound coils 16 of the initial coil assembly 40 from the radially outer side toward the radially inner side. As described above, the tooth holes 42, into which the teeth 22 of the stator core 14 are to be inserted to be disposed, are formed between the slot housed portions 30 and 32 of two coaxially wound coils 16, of the coil assembly 40, disposed adjacent to each other in the circumferential direction. Thus, spaces in which the teeth 22 or the like are not present are formed in the circumferential direction of the slot housed portions 30 and 32 of the coaxially wound coils 16 before the coil assembly 40 is assembled to the stator core 14. Therefore, the insulating members 44 can be easily inserted into the slot housed portions 30 and 32 of the coaxially wound coils 16. Insertion of the insulating members 44 can be performed at the same time as insertion of the coils unlike the related art, in which insertion of the insulating members and insertion of the coils are performed in separate processes. Therefore, it is possible to shorten the working time, and to improve the productivity.

After the insulating members 44 are mounted to the slot housed portions 30 and 32 of the coaxially wound coils 16 from the radially outer side as described above, the coaxially wound coils 16 of the coil assembly 40 are pushed out toward the radially outer side to be assembled to the annular stator core 14. In this event, the slot housed portions 30 and 32 of the coaxially wound coils 16 are moved from the radially inner side toward the radially outer side together with the insulating members 44 to be inserted into the slots 24 of the stator core 14. Therefore, the insulating members 44 in a thin film shape, which are disposed between the coaxially wound coils 16 and the stator core 14, can be disposed appropriately in the slots 24 when the coil assembly 40 is assembled to the annular stator core 14 by pushing out the coaxially wound coils 16 toward the radially outer side, which suppresses formation of wrinkles in the insulating members 44 or a break of the insulating members 44.

In the embodiment described above, the pushing device 70 corresponds to the "pusher," the first guide jigs 52 correspond to the "guide jigs," and the second and third guide jigs 54 and 56 correspond to the "widened guide portions."

In the embodiment described above, the guide jigs 50 are attached to the initial coil assembly 40 by inserting the guide jigs 50 from the radially outer side toward the radially inner side of the coil assembly 40. With such a configuration, the guide jigs 50 can be easily attached to the initial coil assembly 40. However, the present disclosure is not limited thereto. The guide jigs 50 may be attached to the initial coil assembly 40 by inserting the guide jigs 50 from the radially inner side toward the radially outer side of the coil assembly 40 if there is a sufficient space on the radially inner side of the initial coil assembly 40.

In the embodiment described above, the rollers 74a and 74b which push out the coaxially wound coils 16 which constitute the coil assembly 40 radially from the radially inner side toward the radially outer side are formed in a circular column shape. However, the present disclosure is not limited thereto. The rollers 74a and 74b may be formed in a tapered shape in which corner portions on the radially outer side contacted by the coaxially wound coils 16 are cut. With such a modification, the coil end portions 34 and 36 of the coaxially wound coils 16 can be shaped so as to be inclined radially outward with respect to the slot housed portions 30 and 32, which can shorten the axial length of the stator 12.

In the embodiment described above, the rollers 74a and 74b which push out the coaxially wound coils 16 which constitute the coil assembly 40 radially from the radially inner side toward the radially outer side are coupled to each other by the shaft 76 which penetrates the radially inner side of the coil assembly 40 in the axial direction. However, the present disclosure is not limited thereto. The roller 74a and the roller 74b may be supported separately and independently without using the shaft 76. Also with such a modification, the coil end portions 34 and 36 of the coaxially wound coils 16 can be shaped so as to be inclined radially outward with respect to the slot housed portions 30 and 32, which can shorten the axial length of the stator 12.

In the embodiment described above, the coaxially wound coils 16 are pushed out radially while changing the position, in the circumferential direction, of the coil assembly 40 contacted by the roller 74 by relatively moving the roller 74 from the side of the axial center of the stator 12 toward the radially outer side while rotating the jigged stator 12 which is held by the holding stand 72. However, the present disclosure is not limited thereto. For example, all the coaxially wound coils 16 over the entire circumference may be pushed out radially at the same time using bar-like or plate-like jigs that are moved from the side of the axial center of the stator 12 toward the radially outer side.

In the embodiment described above, the insulating members 44 are disposed with respect to the coil assembly 40 in which the plurality of coaxially wound coils 16 are disposed in an annular arrangement, and thereafter inserted into the slots 24 of the stator core 14 together with the coaxially wound coils 16. However, the present disclosure is not limited thereto. The insulating members 44 may be disposed in the slots 24 of the stator core 14, and thereafter the coaxially wound coils 16 of the coil assembly 40 may be inserted into the slots 24.

In the embodiment described above, the guide jigs 50 are assembled to the coil assembly 40 after the coil assembly 40 in an annular cage shape is completed. However, the present disclosure is not limited thereto. The guide jigs 50 may be assembled when a certain number (e.g. half the number) of the coaxially wound coils 16 of the coil assembly 40 are assembled. After that, semi-assemblies each with half the number of the coaxially wound coils 16 may be assembled to each other to finally assemble the guide jigs 50.

In the embodiment described above, The guide jigs 50 each have a tapered shape, and the guide jigs 50 are inserted from the radially outer side toward the radially inner side of the coil assembly 40. However, the present disclosure is not limited thereto. For example, plate-like guide jigs may be slid from the radially inner side toward the radially outer side of the coil assembly 40 to be assembled to the coil assembly 40.

In the embodiment described above, the coil assembly 40, which is constituted of the plurality of coaxially wound coils 16, is formed in a cylindrical shape so as to have the same diameter on the side of the coil end portions 34 and on the side of the coil end portions 36. However, the present disclosure is not limited thereto. The coil assembly 40 may be formed in a conical shape (i.e. a tapered shape in section) so as to have different diameters between the side of the coil end portions 34 and the side of the coil end portions 36.

In relation to the embodiment described above, the following configurations are further disclosed.

[1] A stator assembly method in which coils (16) that have slot housed portions (30, 32) and coil end portions (34, 36) formed from a conductive wire are mounted to an annular stator core (14) that has a plurality of teeth (22) that extend from a back yoke (20) toward an inner side in a radial direction and slots (24) formed between two of the teeth (22), including: a coil assembly forming step of forming a coil assembly (40) in which a plurality of the coils (16) are disposed in an annular arrangement and in which the slot housed portions (30, 32) of two of the coils (16) located away from each other in a circumferential direction form slot housed bundles (46) to be housed in the same slot (24) of the stator core (14); a jig disposing step of moving guide jigs (50) configured to form guide surfaces with respect to tooth holes (42), of the coil assembly (40), formed between two of the slot housed bundles (46) disposed adjacent to each other in the circumferential direction and inserting the guide jigs (50) into the tooth holes (42) to dispose the guide jigs (50) with respect to the coil assembly (40); and a coil inserting step of pushing out the plurality of coils (16) which constitute the coil assembly (40) radially from a radially inner side toward a radially outer side, with the coil assembly (40) disposed in a radially inner space of the stator core (14) and with the guide surfaces of the guide jigs (50) in parallel with wall surfaces of the teeth (22), to insert the slot housed portions (30, 32) of the coils (16) into the slots (24) of the stator core (14) while the guide jigs (50) are guiding the plurality of coils (16).

According to the configuration described in [1], a coil assembly (40), in which a plurality of the coils (16) are disposed in an annular arrangement and in which the slot housed portions (30, 32) of two of the coils (16) located away from each other in a circumferential direction form slot housed bundles to be housed in the same slot (24), is formed. The guide jigs (50) are moved with respect to the tooth holes (40) of the coil assembly (40), and inserted into the tooth holes (42) to dispose the guide jigs (50) with respect to the coil assembly (40). With the coil assembly (40) disposed in a radially inner space of the stator core (14) and with the guide surfaces of the guide jigs (50) in parallel with wall surfaces of the teeth (22), the slot housed portions (30, 32) of the coils (16) are inserted into the slots (24) of the stator core (14) while the guide jigs (50) are guiding the coils (16) of the coil assembly (40).

With such a technique, in constituting the coil assembly (40) from the plurality of coils (16), it is not necessary to assemble the coils (16) to the jigs, and deformation of the coils (16) that brings the slot housed portions (30, 32) on both sides closer to each other is not necessary, or the amount of such deformation is small. Thus, it is possible to suppress the insertion load of inserting the coils (16) into the slots (24) in mounting the coil assembly (40) to the stator core (14).

[2] The stator assembly method described in [1], in which: a width of the guide jigs (50) gradually becomes smaller from one side toward the other side; and the jig disposing step includes disposing the guide jigs (50) with respect to the coil assembly (40) such that the one side of the guide jigs (50) faces the radially outer side of the coil assembly (40) and the other side of the guide jigs (50) faces the radially inner side of the coil assembly (40).

[3] The stator assembly method described in [1] or [2], in which the jig disposing step includes disposing the guide jigs (50) with respect to the coil assembly (40) by inserting the guide jigs (50) into the tooth holes (42) from the radially outer side toward the radially inner side of the coil assembly (40).

According to the configuration described in [3], the guide jigs (50) can be easily disposed with respect to the coil assembly (40).

[4] The stator assembly method described in any one of [1] to [3], in which the guide jigs (50) are plate-like members that extend in both the radial direction and an axial direction of the stator core (14).

[5] The stator assembly method described in any one of [1] to [4], in which: the guide jigs (50) include widened guide portions (54, 56) provided on an outer side, in the axial direction, of the stator core (14) to extend in the radial direction so as to overlap the teeth (22) as seen in the axial direction; and a width of the widened guide portions (54, 56) at each position in the radial direction is equal to or more than a width of the teeth (22) at the same position in the radial direction.

According to the configuration described in [5], rubbing of the conductive wires of the coils (16) of the coil assembly 40 against surfaces of the teeth 22 can be avoided when the coils (16) are guided by the widened guide portions (54, 56) when the coils (16) are inserted into the slots (24).

[6] The stator assembly method described in any one of [1] to [5], in which the conductive wire is a rectangular conductive wire.

[7] The stator assembly method described in any one of [1] to [6], in which the coils (16) are coaxially wound coils.

[8] The stator assembly method described in any one of [1] to [7], in which two of the coils (16) of the coil assembly (40), the slot housed portions (30, 32) of which are to be housed in the same slot (24), are assembled such that the conductive wires of the slot housed portions (30, 32) are arranged alternately in the radial direction.

[9] The stator assembly method according to any one of [1] to [8], further including: an insulating member mounting step of mounting insulating members (44) to the plurality of slot housed bundles of the coil assembly (40), which has been formed in the coil assembly forming step, in which the coil inserting step includes inserting the slot housed portions (30, 32) of the coils (16) into the slots (24) of the stator core (14) by inserting the slot housed bundles of the coil assembly (40), to which the insulating members (44) have been mounted in the insulating member mounting step, into the slots (24) of the stator core (14).

According to the configuration described in [9], the insulating members (44), which are configured to secure electrical insulation between the coils (16) and the stator core (14), can be easily mounted to the coils (16) of the coil assembly (40).

[10] A stator assembly apparatus (10) that mounts coils (16) that have slot housed portions (30, 32) and coil end portions (34, 36) formed from a conductive wire to an annular stator core (14) that has a plurality of teeth (22) that extend from a back yoke (20) toward an inner side in a radial direction and slots (24) formed between two of the teeth (22), including: guide jigs (50) configured to form guide surfaces, the guide jigs (50) being moved with respect to tooth holes (42) of a coil assembly (40) and inserted into the tooth holes (42) to be disposed with respect to the coil assembly (40), the tooth holes (42) being formed between two of slot housed bundles, which are disposed adjacent to each other in a circumferential direction, the coil assembly (40) in which a plurality of the coils (16) are disposed in an annular arrangement and in which the slot housed portions (30, 32) of two of the coils (16) located away from each other in the circumferential direction form the slot housed bundles to be housed in the same slot (24) of the stator core (14); and a pusher (70) for pushing out the plurality of coils (16) which constitute the coil assembly (40) radially from a radially inner side toward a radially outer side, with the coil assembly (40) disposed in a radially inner space of the stator core (14) and with the guide surfaces of the guide jigs (50) in parallel with wall surfaces of the teeth (22), to insert the slot housed portions (30, 32) of the coils (16) into the slots (24) of the stator core (14) while the guide jigs (50) are guiding the plurality of coils (16).

According to the configuration described in [10], a coil assembly (40), in which a plurality of the coils (16) are disposed in an annular arrangement and in which the slot housed portions (30, 32) of two of the coils (16) located away from each other in a circumferential direction form slot housed bundles to be housed in the same slot (24), is formed, and thereafter the guide jigs (50) are moved with respect to the tooth holes (42) of the coil assembly (40), and inserted into the tooth holes (42) to dispose the guide jigs (50) with respect to the coil assembly (40). With the coil assembly (40) disposed in a radially inner space of the stator core (14) and with the guide surfaces of the guide jigs (50) in parallel with wall surfaces of the teeth (22), the pusher (70) inserts the slot housed portions (30, 32) of the coils (16) into the slots (24) of the stator core (14) while the guide jigs are guiding the coils (16) of the coil assembly (40).

With such an apparatus, in constituting the coil assembly (40) from the plurality of coils (16), it is not necessary to assemble the coils (16) to the jigs, and deformation of the coils (16) that brings the slot housed portions (30, 32) on both sides closer to each other is not necessary, or the amount of such deformation is small. Thus, it is possible to suppress the insertion load of inserting the coils (16) into the slots (24) in mounting the coil assembly (40) to the stator core (14).

[11] The stator assembly apparatus (10) described in [10], in which the pusher (70) includes a roller (74) that contacts the coil end portions (34, 36) of the coils (16).

The present international application claims priority to Japanese Patent Application No. 2014-117144 filed Jun. 5, 2014, the entire contents of which are incorporated herein.

The invention claimed is:

1. A stator assembly method in which coils that have slot housed portions and coil ends formed from a conductive wire are mounted to an annular stator core that has a plurality of teeth that extend from a back yoke toward an inner side in a radial direction and slots formed between two of the teeth, comprising:

forming a coil assembly in which a plurality of the coils are disposed in an annular arrangement and in which the slot housed portions of two of the coils located away from each other in a circumferential direction form slot housed bundles to be housed in the same slot of the stator core;

moving guide jigs configured to form guide surfaces with respect to tooth holes, of the coil assembly, formed between two of the slot housed bundles disposed adjacent to each other in the circumferential direction and inserting the guide jigs into the tooth holes to dispose the guide jigs with respect to the coil assembly; and pushing out the plurality of the coils which form the coil assembly radially from a radially inner side toward a radially outer side, with the coil assembly disposed in a radially inner space of the stator core and with the guide surfaces of the guide jigs in parallel with wall surfaces of the teeth, to insert the slot housed portions of the coils into the slots of the stator core while the guide jigs are guiding the plurality of the coils.

2. The stator assembly method according to claim 1, wherein:
a width of the guide jigs gradually becomes smaller from one side toward the other side; and
the moving and inserting the guide jigs includes disposing the guide jigs with respect to the coil assembly such that the one side of the guide jigs faces the radially outer side of the coil assembly and the other side of the guide jigs faces the radially inner side of the coil assembly.

3. The stator assembly method according to claim 2, wherein
the moving and inserting the guide jigs includes disposing the guide jigs with respect to the coil assembly by inserting the guide jigs into the tooth holes from the radially outer side toward the radially inner side of the coil assembly.

4. The stator assembly method according to claim 3, wherein
the guide jigs are plates that extend in both the radial direction and an axial direction of the stator core.

5. The stator assembly method according to claim 4, wherein:
the guide jigs include widened guides provided on an outer side, in the axial direction, of the stator core to extend in the radial direction so as to overlap the teeth as seen in the axial direction; and
a width of the widened guides at each position in the radial direction is equal to or more than a width of the teeth at the same position in the radial direction.

6. The stator assembly method according to claim 2, wherein
the guide jigs are plates that extend in both the radial direction and an axial direction of the stator core.

7. The stator assembly method according to claim 2, wherein:
the guide jigs include widened guides provided on an outer side, in the axial direction, of the stator core to extend in the radial direction so as to overlap the teeth as seen in the axial direction; and
a width of the widened guides at each position in the radial direction is equal to or more than a width of the teeth at the same position in the radial direction.

8. The stator assembly method according to claim 2, wherein
two of the coils of the coil assembly, the slot housed portions of which are to be housed in the same slot, are assembled such that the conductive wires of the slot housed portions are arranged alternately in the radial direction.

9. The stator assembly method according to claim 1, wherein
the moving and inserting the guide jigs includes disposing the guide jigs with respect to the coil assembly by inserting the guide jigs into the tooth holes from the radially outer side toward the radially inner side of the coil assembly.

10. The stator assembly method according to claim 9, wherein the guide jigs are plates that extend in both the radial direction and an axial direction of the stator core.

11. The stator assembly method according to claim 9, wherein:
the guide jigs include widened guides provided on an outer side, in the axial direction, of the stator core to extend in the radial direction so as to overlap the teeth as seen in the axial direction; and
a width of the widened guides at each position in the radial direction is equal to or more than a width of the teeth at the same position in the radial direction.

12. The stator assembly method according to claim 1, wherein
the guide jigs are plates that extend in both the radial direction and an axial direction of the stator core.

13. The stator assembly method according to claim 12, wherein:
the guide jigs include widened guides provided on an outer side, in the axial direction, of the stator core to extend in the radial direction so as to overlap the teeth as seen in the axial direction; and
a width of the widened guides at each position in the radial direction is equal to or more than a width of the teeth at the same position in the radial direction.

14. The stator assembly method according to claim 1, wherein:
the guide jigs include widened guides provided on an outer side, in the axial direction, of the stator core to extend in the radial direction so as to overlap the teeth as seen in the axial direction; and
a width of the widened guides at each position in the radial direction is equal to or more than a width of the teeth at the same position in the radial direction.

15. The stator assembly method according to claim 1, wherein
the conductive wire is a rectangular conductive wire.

16. The stator assembly method according to claim 1, wherein
the coils are coaxially wound coils.

17. The stator assembly method according to claim 1, wherein
two of the coils of the coil assembly, the slot housed portions of which are to be housed in the same slot, are assembled such that the conductive wires of the slot housed portions are arranged alternately in the radial direction.

18. The stator assembly method according to claim 1, further comprising:
mounting insulating members to the plurality of slot housed bundles of the coil assembly, which has been formed, wherein
inserting the slot housed portions includes inserting the slot housed portions of the coils into the slots of the stator core by inserting the slot housed bundles of the coil assembly, to which the insulating members have been mounted, into the slots of the stator core.

19. A stator assembly apparatus that mounts coils that have slot housed portions and coil ends formed from a conductive wire to an annular stator core that has a plurality of teeth that extend from a back yoke toward an inner side in a radial direction and slots formed between two of the teeth, comprising:
guide jigs configured to form guide surfaces, the guide jigs being moved with respect to tooth holes of a coil assembly and inserted into the tooth holes to be disposed with respect to the coil assembly, the tooth holes being formed between two of slot housed bundles, which are disposed adjacent to each other in a circumferential direction, the coil assembly in which a plurality of the coils are disposed in an annular arrangement and in which the slot housed portions of two of the coils located away from each other in a circumferential direction form the slot housed bundles to be housed in the same slot of the stator core; and a pusher that pushes out the plurality of the coils which form the coil assembly radially from a radially inner side toward a radially outer side, with the coil assembly disposed in a radially inner space of the stator core and with the guide surfaces of the guide jigs in parallel with wall surfaces of the teeth, to insert the slot housed portions of the coils into the slots of the stator core while the guide jigs are guiding the plurality of the coils.

20. The stator assembly apparatus according to claim 19, wherein the pusher includes a roller that contacts the coil end portions of the coils.

* * * * *